(12) United States Patent
Ilic et al.

(10) Patent No.: US 11,483,305 B2
(45) Date of Patent: Oct. 25, 2022

(54) WINDOWS SINGLE SIGN-ON MECHANISM

(71) Applicant: Nutanix, Inc., San Jose, CA (US)

(72) Inventors: Darko Ilic, San Mateo, CA (US); Marko Zivanovic, San Mateo, CA (US)

(73) Assignee: Nutanix, Inc., San Jose, CA (US)

(*) Notice: Subject to any disclaimer, the term of this patent is extended or adjusted under 35 U.S.C. 154(b) by 154 days.

(21) Appl. No.: 16/943,894

(22) Filed: Jul. 30, 2020

(65) Prior Publication Data

US 2021/0400031 A1 Dec. 23, 2021

Related U.S. Application Data

(60) Provisional application No. 63/050,448, filed on Jul. 10, 2020, provisional application No. 63/043,062, filed on Jun. 23, 2020.

(51) Int. Cl.
*H04L 29/06* (2006.01)
*H04L 9/40* (2022.01)
*G06F 9/455* (2018.01)

(52) U.S. Cl.
CPC ........ *H04L 63/083* (2013.01); *G06F 9/45558* (2013.01); *H04L 63/0435* (2013.01); *H04L 63/10* (2013.01); *G06F 2009/45587* (2013.01)

(58) Field of Classification Search
CPC ... H04L 63/083; H04L 63/0435; H04L 63/10; H04L 64/0442; G06F 9/45558
USPC ...................................................... 726/16, 19
See application file for complete search history.

(56) References Cited

U.S. PATENT DOCUMENTS

| | | | |
|---|---|---|---|
| 8,505,083 B2 | 8/2013 | Kuzin et al. | |
| 8,549,518 B1 | 10/2013 | Aron et al. | |
| 8,650,625 B2 | 2/2014 | Grandcolas et al. | |
| 8,812,687 B2 | 8/2014 | Das et al. | |
| 8,850,130 B1 | 9/2014 | Aron et al. | |
| 8,856,917 B2 | 10/2014 | Das et al. | |
| 9,860,064 B2* | 1/2018 | Huang | H04L 63/083 |
| 10,331,475 B2 | 6/2019 | Beveridge et al. | |
| 2017/0223010 A1 | 8/2017 | Wilkinson et al. | |
| 2017/0371519 A1 | 12/2017 | Beveridge et al. | |
| 2018/0115551 A1* | 4/2018 | Cole | H04L 41/18 |
| 2019/0370034 A1 | 12/2019 | Goodman | |
| 2021/0152345 A1* | 5/2021 | Beloskur | H04L 9/0844 |

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Longbit Chai
(74) *Attorney, Agent, or Firm* — Foley & Lardner LLP

(57) ABSTRACT

An illustrative embodiment disclosed herein is an apparatus including a processor with programmed instructions to receive, from a user device and via a network, encrypted credentials for logging on a user associated with the user device to a virtual machine. The processor is coupled to the virtual machine via a hypervisor. The processor has programmed instructions to decrypt the credentials, send, to an operating system of the virtual machine, the decrypted credentials, and cause the operating system to log the user on to the virtual machine.

25 Claims, 5 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
RFC 4880—OpenPGP Message Format Nov. 2007.
The impact of managing user profiles with FSLogix _ GO-EUC—Sep. 17 2019.
Vmware-stateless-virtual-desktops-ref-arch-white-paper-2012.

* cited by examiner

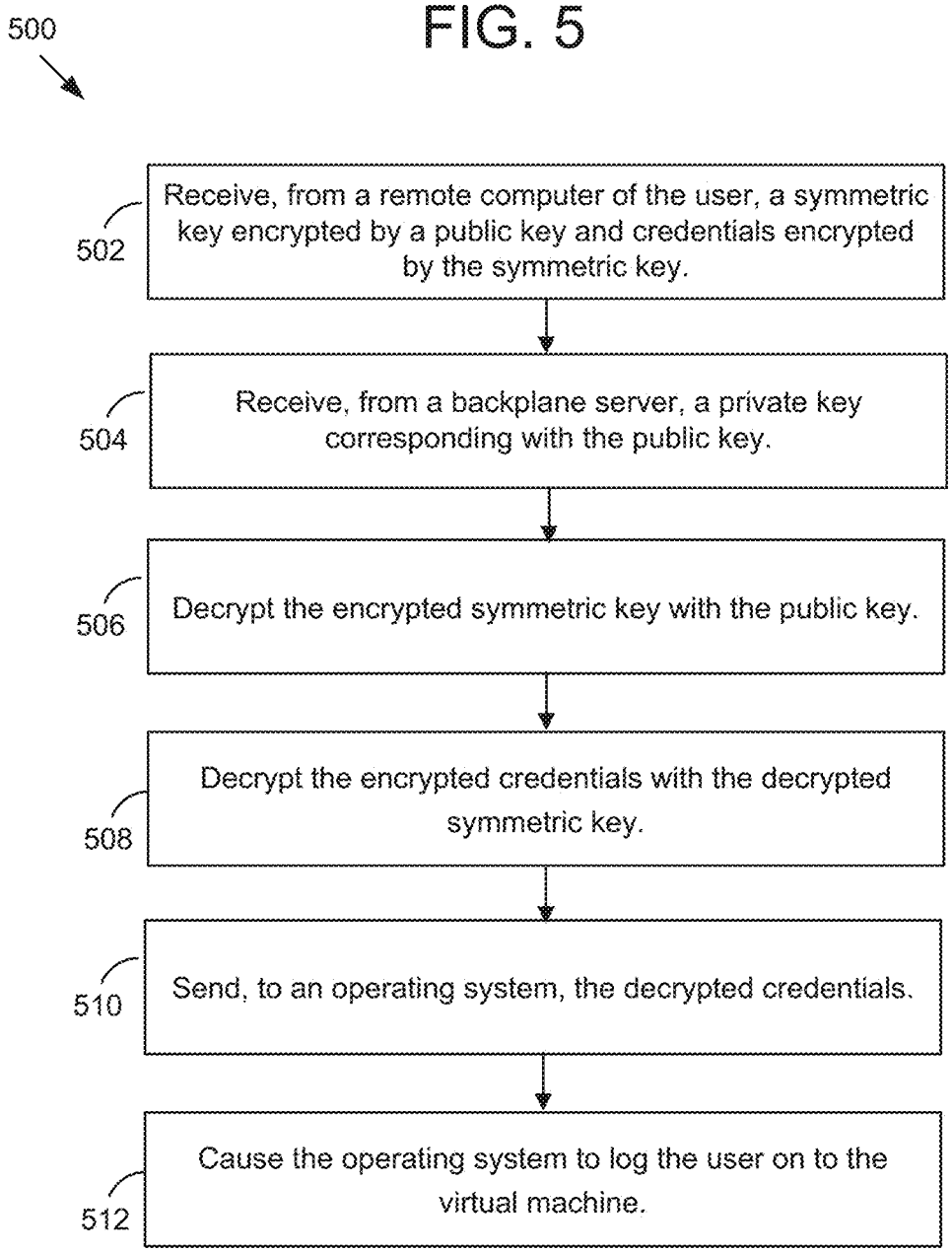

WINDOWS SINGLE SIGN-ON MECHANISM

CROSS-REFERENCE TO RELATED APPLICATION

This application is related and claims priority under 35 U.S. § 119(e) to U.S. Provisional Patent Application No. 63/050,448, filed Jul. 10, 2020, titled "WINDOWS SINGLE SIGN-ON MECHANISM," and U.S. Provisional Patent Application No. 63/043,062, filed Jun. 23, 2020, titled "WINDOWS SINGLE SIGN-ON MECHANISM," the entire contents of which are incorporated herein by reference for all purposes.

BACKGROUND

Remote desktop refers to a feature that allows a personal computer's desktop environment to be run remotely on one system (e.g., personal computer, server), while being displayed on a separate client device. Some remote desktop applications allow attaching to an existing user's session (e.g., a running desktop) and remote controlling, either displaying the remote control session or blanking the screen.

SUMMARY

Aspects of the present disclosure relate generally to a virtualization environment, and more particularly to a remote desktop system.

An illustrative embodiment disclosed herein is an apparatus including a processor with programmed instructions to receive, from a user device and via a network, encrypted credentials for logging on a user associated with the user device to a virtual machine. The processor is coupled to the virtual machine via a hypervisor. The processor has programmed instructions to decrypt the credentials, send, to an operating system of the virtual machine, the decrypted credentials, and cause the operating system to log the user on to the virtual machine.

Another illustrative embodiment disclosed herein is a non-transitory computer readable storage medium having instructions stored thereon that, upon execution by a processor, causes the processor to perform operations including receiving, from a user device and via a network, encrypted credentials for logging on a user associated with the user device to a virtual machine. The processor is coupled to the virtual machine via a hypervisor. The operations include decrypting the credentials, sending, to an operating system on the virtual machine, the decrypted credentials, and causing the operating system to log the user on to the virtual machine.

Another illustrative embodiment disclosed herein is a computer-implemented method including receiving, by a processor, from a user device, and via a network, encrypted credentials for logging on a user associated with the user device to a virtual machine. The processor is coupled to the virtual machine via a hypervisor. The method includes decrypting, by the processor, the credentials, sending, by the processor and to an operating system on the virtual machine, the decrypted credentials, and causing, by the processor, the operating system to log the user on to the virtual machine.

Another illustrative embodiment disclosed herein is a non-transitory computer readable storage medium having instructions stored thereon that, upon execution by a processor, causes the processor to perform operations including serving as a proxy for a user to logon to an interactive session on an operating system of a virtual machine by receiving, from a remote computer of the user, via a first communication channel across a network, and using a first command-and-control communication protocol, a symmetric key encrypted by a public key and credentials encrypted by the symmetric key. The credentials are for logging on the user to the interactive session on the operating system of the virtual machine. The operations include serving as the proxy for the user to logon to the interactive session on the operating system of the virtual machine by receiving, from a backplane server, via a second communication channel across the network, and using a second command-and-control communication protocol, a private key corresponding with the public key, decrypting the encrypted symmetric key with the public key, decrypting the encrypted credentials with the decrypted symmetric key, sending, to the operating system, the decrypted credentials, and causing the operating system to log the user on to the virtual machine.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 is a flowchart of an example method for starting a session, in accordance with some embodiments of the present disclosure.

Figure 1:
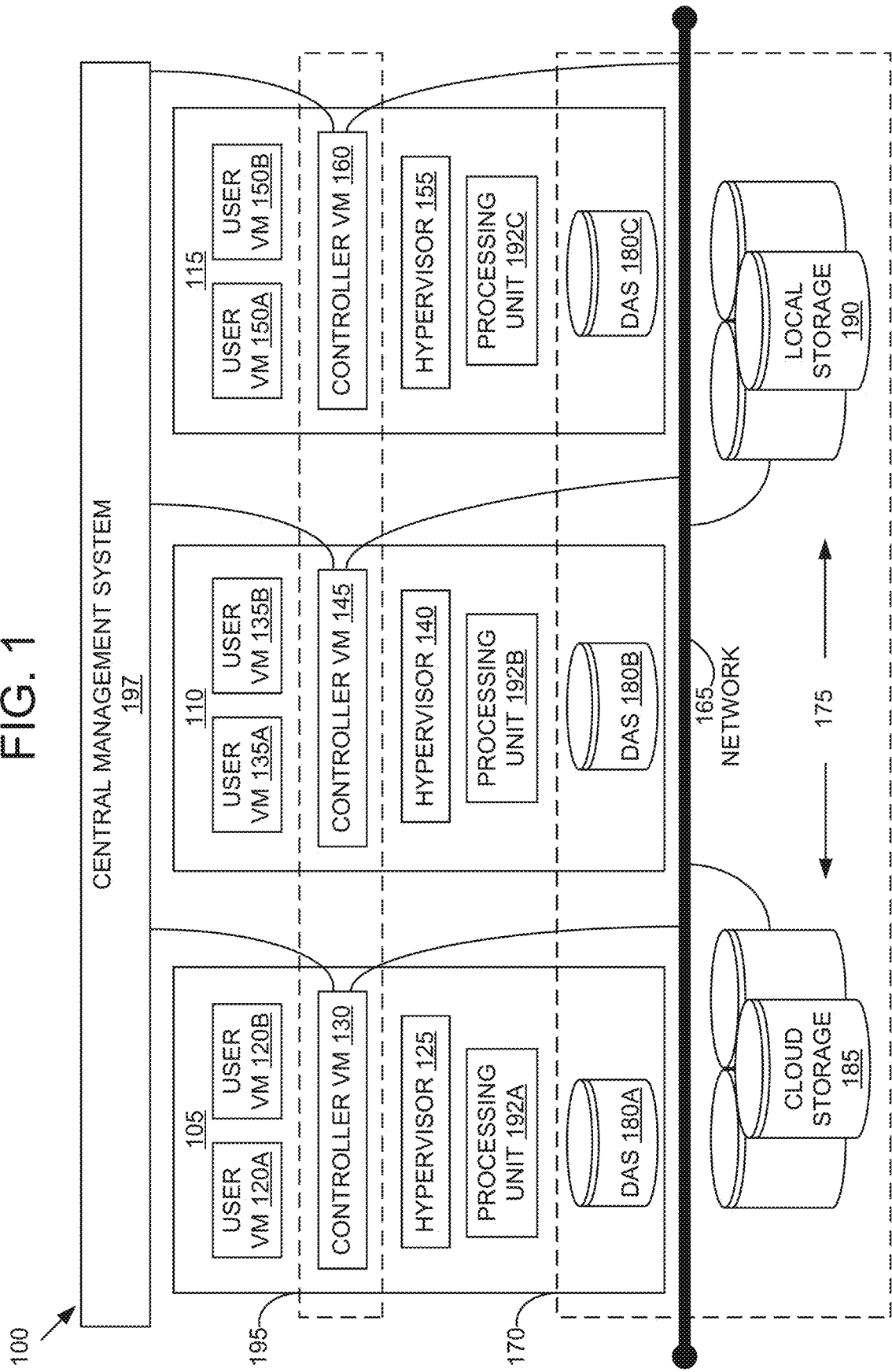
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In order to access their remote desktop or remote applications, users of some conventional desktops need to be signed into their local computer and, additionally, at the start of each continuous use session, the users need to sign into the remote computer operating system. Some conventional remote desktops transfer credentials from the local computer to the remote computer in an unsecure way, leaving the users susceptible to man-in-the-middle attacks and other vulnerabilities. In some embodiments, the conventional remote desktop systems transfer encrypted credentials to an operating system of a virtual machine (VM), thereby requiring the operating system to use time and resources to decrypt the credentials. What is needed is a single sign-on (SSO) mechanism for remote desktops that can securely transfer credentials across a network, that is transparent to the user, and that does not overburden the virtual machine's operating system.

Disclosed herein are embodiments related to a method, system, and a non-transitory computer readable medium for a single sign-on functionality. In some embodiments, user credentials are securely stored in memory or storage of the local browser and/or local computer of the user. In some embodiments, on demand, the credentials are encrypted, transported to the workload virtual machine (VM), decrypted by a guest agent on the VM, and sent to the VM's operating system to trigger an interactive session logon. By performing the decryption by the guest agent, in some embodiments, the system (e.g., the guest agent) serves as a proxy for the user with respect to the operating system. In some embodiments, encryption keys are generated by, and stored in a backplane. In some embodiments, encrypted credentials and encryption keys are stored in different locations and only come together inside of the workload VM, temporarily, to perform the logon. After logging on, the credentials and keys on the workload VM can be deleted.

Some of the embodiments provide users with means of remotely accessing and interactively using a remote operating system's desktop or applications running on a remote computer, as if they were running on their local device, by mirroring display from the remote computer to the local device and mirroring inputs from the local device to the remote computer. Some embodiments of the mechanism described herein eliminate the repeated, secondary sign in process, making using the system and method of the present disclosure faster and more convenient for the users than that of conventional remote desktop systems. Some embodiments eliminate the need for users to manually sign into their remote computers every time they access their desktops or applications by securely storing users' credentials on their local device after the first successful sign in. In some embodiments, on each subsequent user access to their desktop or application, these stored credentials are securely transferred and entered into the remote computer, as if they were typed in the by the user themselves. In some embodiments, the mechanism automatically triggers logon to the remote computer, is completely transparent to the user, and works seamlessly with the operating system of the VM without overburdening it.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfill the input/output request (and/or request another component within the virtual computing system 100 to fulfill that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a cluster (e.g., storage cluster, physical cluster, cluster of nodes, cluster of nodes in a network, etc.). Generally speaking, all of the nodes (e.g., the first node 105, the second node 110, and the third node 115) in the virtual computing system 100 may be divided into one or more clusters. One or more components of the storage pool 170 or the processing units 192 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Windows Single Sign-On Mechanism

Figure 2:
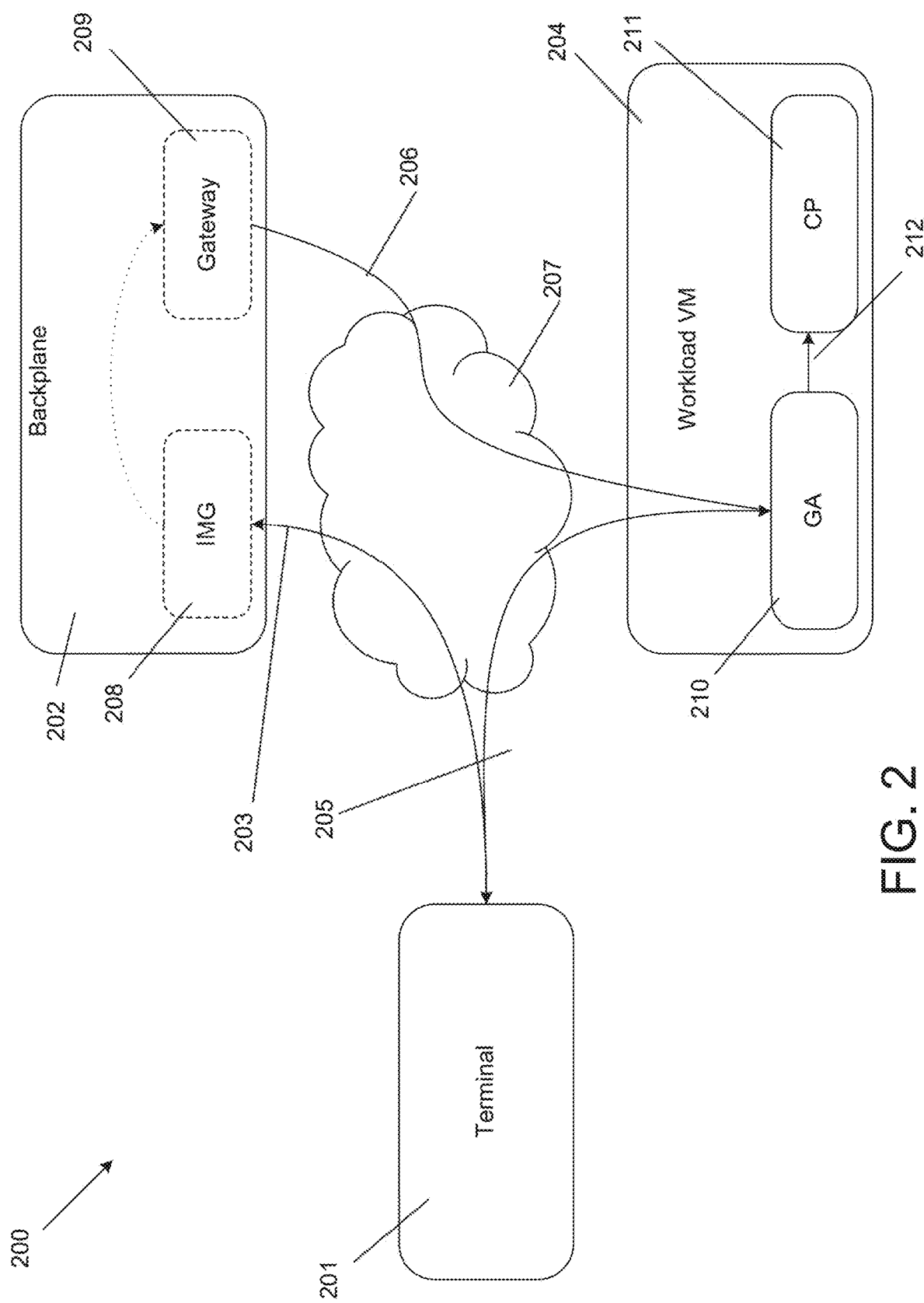
FIG. 2 is an example block diagram of a remote desktop system, in accordance with some embodiments of the present disclosure.

Referring now to FIG. 2, an example block diagram of a remote desktop system 200 (e.g., the platform 200) is shown, in accordance with some embodiments of the present disclosure. The remote desktop system 200 includes a terminal 201, a backplane 202 coupled to the terminal 202 via a first communication channel 203, and a workload virtual machine (VM) 204 coupled to the terminal 201 via a second communication channel 205 and coupled to the backplane 202 via a third communication channel 206. All the communication channels are in one or more networks 207 (e.g., one or more public networks, private networks, etc.). In some embodiments, the backplane 202 includes an identity management service (IMG) 208 and a gateway 209. The workload VM 204 includes a guest agent (GA) 210 coupled to the backplane 202 (e.g., the gateway 209) via the third communication channel 206 and, optionally, a credential provider (CP) 211 coupled to the GA 210 via named pipes 212. In some embodiments, the named pipes include existing operating system (e.g., Windows) security mechanisms used to ensure only authorized components have access to the pipes.

In some embodiments, the terminal 201 is a component (e.g., software component) of the remote desktop system 200 running inside a browser of a computing device (e.g., desktop, laptop, thin client, mobile phone, smart phone/watch/device, etc.) of the user. In some embodiments, the terminal 201 renders (e.g., mirrors) remote computer display on the local device and redirects (e.g., mirrors) the local input (e.g., keyboard, mouse, touch, etc.) to the remote computer.

In some embodiments, the backplane 202 includes one or more components (e.g., one or more software components) running in the cloud. In some embodiments, the backplane 202 orchestrates and manages cloud resources (e.g., virtual machines, disks, networks, etc.) used by end users, such as resources of the virtual computing system 100 of FIG. 1. In some embodiments, the backplane 202 is an instance of a user VM 120 with respect to the virtual computing system 100 of FIG. 1. In some embodiments, the IMG 208 stores credentials for third-party services and authenticates the user to the third-party service providers, using the credentials, in order to gain access to the third-party services.

In some embodiments, the guest agent 210 is one or more components (e.g., one or more software components) running on the remote computers accessed by end users. In some embodiments, the guest agent 210 implements "command-and-control" communication between the remote computer (e.g., the VM) and the backplane 202. In some embodiments, the CP 211 enables remote, programmatic interactive session logon with supplied local or domain user credentials. In some embodiments, the user can gain access to a VM without gaining access to any other network resources.

In some embodiments, the user is a non-domain joined instance (non-DJI) user (e.g., a standalone user, a workgroup user). That is, the user has the non-DJI feature enabled, meaning the user can gain access to a VM even though the user (e.g., an account of the user) is not part of an enterprise/organization domain/directory managed by a directory service (e.g., Active Directory). In some embodiments, a non-DJI user is part of a workgroup, rather than a domain. In some embodiments, the user's name indicates that the user is not part of domain/directory. In some embodiments, a non-DJI user does not have a "@" symbol in the user name (e.g., user account name). In some embodiments, a non-DJI user does not have an organization's name in the user name.

The VM used by the non-DJI user can be referred to as a non-DJI VM, in that the VM (e.g., the operating system on the VM) is a standalone VM and not part of (e.g., not joined to) the organization's directory. A non-DJI VM lacks of group policy for management and domain trust for authentication/authorization. A non-DJI VM does not have access to network/corporate resources (e.g., servers, processors, memory, storage). All the resources of a non-DJI VM are local resources. A non-DJI VM can become a DJI VM by being joined to a directory/domain by a user that has domain privileges (e.g., a DJI user). The VM can have domain access for a DJI user and no domain access for the non-DJI user.

In some embodiments, the workload VM 204 is an instance of a user VM 120 with respect to the virtual computing system 100 of FIG. 1. The workload VM 204 is on a same or different cluster (e.g., datacenter, region, public cloud, private cloud, etc.) as/than a cluster on which the backplane 202 resides, in some embodiments.

In some embodiments, the terminal 201 generates a symmetric key, retrieves a public key from the IMG 208, prompts user for credentials, and encrypts and stores the credentials in memory or storage within or coupled to the terminal 201. In some embodiments, the terminal 201 sends the encrypted credentials to initiate interactive a session logon. In some embodiments, the gateway 209 reads the private key from the IMG 208 and pushes the private key to the GA 210. In some embodiments, the GA 210 decrypts the credentials and sends them to the CP 211, or to the operating system of the VM, via the CP 211 or directly, to initiate the interactive session logon.

The remote desktop system 200 can start a session without credentials. In some embodiments, the terminal 201 determines that it has no stored credentials. In some embodiments, the terminal 201 generates a single-use symmetric key and requests a public key, e.g., a public public-key-infrastructure (PKI) key, from the backplane (e.g., a control panel (CPanel) within or associated with the backplane 202). In some embodiments, the CPanel obtains user's public key from the IMG 208. In some embodiments, the CPanel sends the user's public key to the terminal 201. In some embodiments, the terminal 201 prompts user for credentials (e.g., username, domain, password). In some embodiments, the terminal 201 encrypts credentials provided and stores a ciphertext in a local storage (e.g., local to the user device). In some embodiments, the terminal 201 sends encrypted credentials data structure such as a binary large object (blob), a JavaScript Object Notation (JSON) object (e.g., file, document), an extensible markup language (XML) object, or a protocol buffer object, to the GA 210 running on workload VM 204.

In some embodiments, the GA 210 receives (e.g., from the gateway 209) a private key (e.g., a private PKI key). In some embodiments, the GA 210 uses the provided private key to decrypt credentials. In some embodiments, the GA 210 sends plain-text credentials to the CP 211 via the named pipe 212 in order to trigger interactive session logon. In some embodiments, in case the CP 211 detects logon errors (e.g., invalid or expired credentials, etc.), it notifies the terminal 201, via the GA 210, of this condition. In some embodiments, responsive to being notified, the terminal 201 deletes stored encrypted credentials, notifies the user of the error, and begins the workflow again (e.g., generates a single-use symmetric key and/or prompts the user for credentials).

The remote desktop system 200 can start a session with stored credentials. In some embodiments, the terminal 201 determines that it has stored credentials. In some embodiments, the terminal 201 sends the encrypted credentials (e.g., blob, JSON object, etc.) to the GA 210 running on the workload VM 204. In some embodiments, the GA 210 is supplied with private key. In some embodiments, the GA 210 uses the provided private key to decrypt the credentials. In some embodiments, the GA 210 sends plain-text credentials to the CP 211 via named pipe 212 in order to trigger the interactive session logon. In some embodiments, in case the CP 211 detects logon errors, it notifies the terminal 201, via the GA 210, of this condition, the terminal 201 deletes stored encrypted credentials, notifies the user of the error and falls back to the workflow for starting a session without stored credentials.

In some embodiments, when required, the terminal 201 generates a single-use, symmetric encryption key, e.g., advanced encryption standard (AES) 256 bit, and the backplane 202 generates the PKI key pair, e.g., Rivest-Shamir-Adleman (RSA) 2048 or 4096 bit keys. In some embodiments, the public key is sent to the terminal 201, which uses generated symmetric key to encrypt user credentials, e.g., using a AES-counter (CTR), and the public key to encrypt the symmetric key used for credentials encryption. In some embodiments, the credentials ciphertext and the symmetric key ciphertext together comprise the encrypted credentials data structure. In some embodiments, the backplane 202 stores only PKI key pair which can be used for additional credentials encryption, with different symmetric encryption key or decryption of existing encrypted credentials data structures.

In some embodiments, passwords are rotated for stored passwords. In some embodiments, keys are cleared from the IMG 208, e.g., after a predetermined period of time. In some embodiments, a new symmetric key is generated in the case the preceding symmetric key is compromised (e.g., a hacked, used or accessed maliciously or by an untrusted source). The user and administrators can request deletion of their data. In some embodiments, if the password fails, users get windows login or users are sent back to the terminal 201 login. In some embodiments, when a streaming gateway is involved, it is encrypted all the way to the workload and the guest agent 210 never gets the decryption key. In some embodiments, for key clean-up on testing environments (e.g., Sandbox) and utility servers, a fail-safe is ensured that it is only sitting in memory or cache that is flushed by windows on reboot.

In some embodiments, if a user logs in from a different browser, the user has new credentials stored from the storage local to the different browser. The user can see how many devices the credentials are stored on (or unique symmetric keys). The user can revoke all sessions or individual ones. In some embodiments, a user agent string is stored so that the user has context of what device it is on. In some embodiments, the user agent string is captured for when the data structure is sent. The user agent string can be used to see if there are attempts to maliciously use the cached credential. In some embodiments, the SSO is an administrator-enforceable setting so that administrators can enforce that it is disabled. In some embodiments, the domain is an attribute like cloud provider and then permissioned to different accounts. In some embodiments, this setting is account by account.

Figure 3:
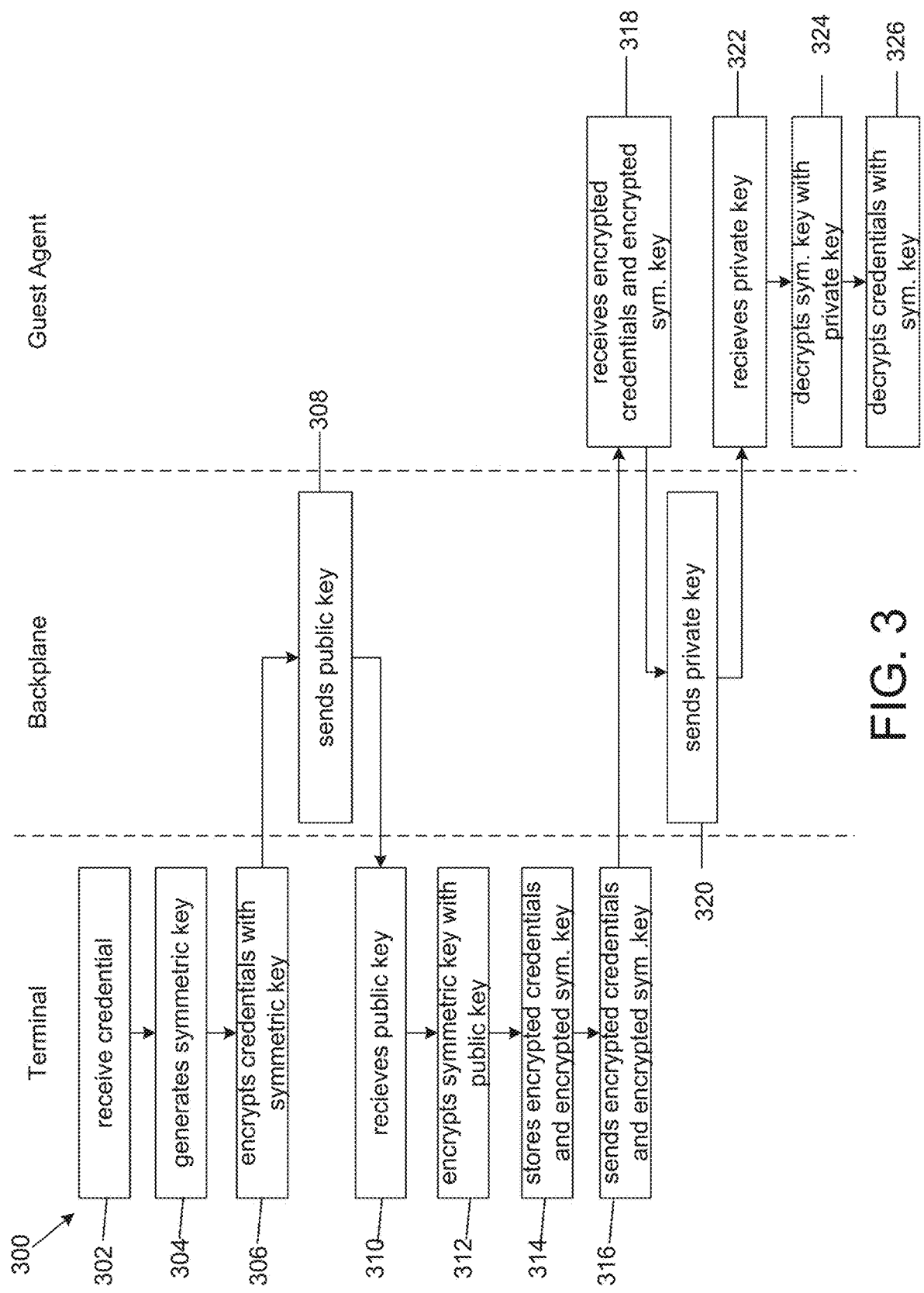
FIG. 3 is a flowchart of an example method for starting a session, in accordance with some embodiments of the present disclosure.

Referring now to FIG. 3, a flowchart of an example method 300 for starting a session is illustrated, in accordance with some embodiments of the present disclosure. The method 300 may be implemented using, or performed by, remote desktop system 200, one or more components of the remote desktop system 200, or a processor associated with the remote desktop system 200 or the one or more components of the remote desktop system 200. Additional, fewer, or different operations may be performed in the method 300 depending on the embodiment.

The terminal 201 checks for previously stored credentials in, for example, the web browser's local storage. If no stored credentials are found, the terminal 201 presents an interface for user to enter their credentials and, in response, receives the credentials (302). In some embodiments, preceding operation 302, the end user logs into the remote desktop system 200 and selects (e.g., clicks an icon) to start their desktop or application. In some embodiments, this command instructs the backplane 202 to provision required resources. In some embodiments, once the resources are available, the terminal 201 application is loaded into the user's web browser to connect to the remote computer and initiate a user session. In some embodiments, if stored credentials are found, the method 300 proceeds to operation 316.

The terminal 201 generates random symmetric key which is used to encrypt the entered credentials (304). The terminal 201 encrypts the credentials with the symmetric key (306). In some embodiments, the terminal 201 contacts the backplane 202 to obtain public key part of the user-specific cryptographic key pair. The backplane 202 sends the public key (308). The terminal 201 receives the public key (310). The terminal 201 uses the obtained public key to encrypt the generated symmetric key (312), so that it can be decrypted only by using corresponding private key. The credentials encrypted with the symmetric key and the symmetric key encrypted with public key are stored in local storage (e.g., the web browser's local storage) (314).

The terminal 201 application fetches the stored encrypted credentials and encrypted key from local storage and sends them to the guest agent 210 (316). The guest agent 210 receives the encrypted credentials and encrypted key (318). The backplane 202 securely transfers private key part of the user-specific key pair to the guest agent 210 (320). The guest agent 210 receives the private key (322).

With both pieces of information, the guest agent 210 uses the private key to decrypt symmetric key (324). The guest agent 210 uses the symmetric key to decrypt the credentials (326). In some embodiments, the plain text credentials are injected into the operating system (e.g., of the workload VM 204) as if they were entered by the user and the logon processes executes. In some embodiments, once the user is logged in, the terminal 201 connects to remoting components now running on the remote computer and user session is started.

Figure 4:
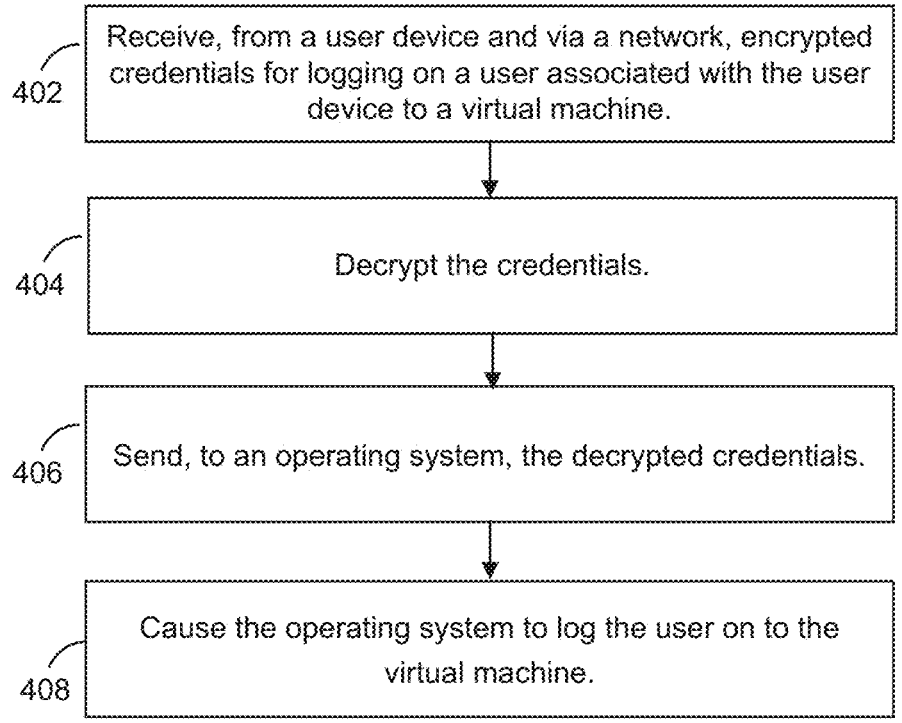
FIG. 4 is a flowchart of an example method for starting a session, in accordance with some embodiments of the present disclosure.

Referring now to FIG. 4, a flowchart of an example method 400 for starting a session is illustrated, in accordance with some embodiments of the present disclosure. The method 400 may be implemented using, or performed by, remote desktop system 200, one or more components of the remote desktop system 200, or a processor associated with the remote desktop system 200 or the one or more components of the remote desktop system 200. Additional, fewer, or different operations may be performed in the method 400 depending on the embodiment. In some embodiments, one or more operations of the method 400 are combined with one or more operations of the method 300.

A guest agent, such as the guest agent 210, receives from a user device, such as a user device including in its browser the terminal 201, and via a network, such as the communication channel 205, encrypted credentials for logging on a user associated with the user device to a VM, such as the workload VM 204 (402). The guest agent decrypts the credentials (404). The guest agent sends, to an operating system (OS) in the VM (e.g., an OS service running on the OS, e.g., via a named pipe or other local communication channel), the decrypted credentials (406). The guest agent causes/triggers the OS to log the user on to the VM (408).

In some embodiments, the guest agent is running on the VM. In some embodiments, the encrypted credentials are received from memory or storage of the user device. In some embodiments, the VM and/or the guest agent deletes the credentials (e.g., any copies of the credentials in encrypted or decrypted form) from the VM after (e.g., responsive to) the VM logs on the user. In some embodiments, the guest agent sends the decrypted credentials to the OS via a credential provider such as the credential provider 211. In some embodiments, the credential provider 211 authenticates the user. In some embodiments, the user only has access to the VM and not any other network resources. In some embodiments, the user is a non-domain joined instance (non-DJI) user.

In some embodiments, the encrypted credentials are encrypted by a symmetric key and the symmetric key is encrypted by a public key. In some embodiments, the guest agent receives the encrypted key and the symmetric key. In some embodiments, the guest agent decrypts the encrypted symmetric key with a private key received from a backplane such as the backplane 202. In some embodiments, the guest agent decrypts the encrypted key using the decrypted symmetric key. In some embodiments, the VM and/or the guest agent deletes the symmetric key (e.g., any copies of the symmetric key in encrypted or decrypted form) from the VM after (e.g., responsive to) the VM logs on the user.

Referring now to FIG. 5, a flowchart of an example method 500 for starting a session (e.g., serving as a proxy for a user to logon to an interactive session on an operating system of a virtual machine) is illustrated, in accordance with some embodiments of the present disclosure. The method 500 may be implemented using, or performed by, remote desktop system 200, one or more components of the remote desktop system 200, or a processor associated with the remote desktop system 200 or the one or more components of the remote desktop system 200. Additional, fewer, or different operations may be performed in the method 500 depending on the embodiment. In some embodiments, one or more operations of the method 500 are combined with one or more operations of at least one of the method 300 and the method 400.

A guest agent, such as the guest agent 210, receives from a remote computer of the user, via a first communication channel across a network, and using a first command-and-control communication protocol, a symmetric key encrypted by a public key and credentials encrypted by the symmetric key, the credentials for logging on the user to the interactive session on the operating system of the virtual machine (502). The guest agent receives, from a backplane server, via a second communication channel across the network, and using a second command-and-control communication protocol, a private key corresponding with the public key (504). The guest agent decrypts the encrypted symmetric key with the public key (506). The guest agent decrypts the encrypted credentials with the decrypted symmetric key (508). The guest agent sends, to an operating system (OS) in the VM, the decrypted credentials (510). The guest agent causes/triggers the OS to log the user on to the VM (512).

In some embodiments, the guest agent is an application coupled to/including a processor for performing the operations of the method 400 or the method 500. In some embodiments, the processor is a on a host machine such as node 105 of FIG. 1 and is coupled to the guest agent (e.g., the application portion of the guest agent) via the operating system and a hypervisor, such as the hypervisor 125 of FIG. 1. In some embodiments, the operating system is running on top of the hypervisor, in some embodiments, the operating system includes the hypervisor, and in some embodiments, the hypervisor includes the operating system. In some embodiments, the guest agent and other applications (e.g., the credential provider) share consumption of the processor. In some embodiments, the guest agent and the operating system share consumption of the processor.

Each of the components (e.g., elements, entities) of the virtual computing system 100 and the remote desktop system 200 (e.g., the terminal 201, the backplane 202, the workload VM 204, the IMG 208, the gateway 209, the GA 210, the CP 211), is implemented using hardware, software, or a combination of hardware or software, in one or more embodiments. The components of the virtual computing system 100 and the remote desktop system 200 can include any application, program, library, script, task, service, process or any type and form of executable instructions executed by one or more processors (e.g., the processing unit 192A), in one or more embodiments. Each of the one or more processors is hardware. The instructions may be stored on one or more computer readable and/or executable storage media including non-transitory storage media such as non-transitory storage media in the storage pool 170 with respect to FIG. 1.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus for performing single sign-on mechanism comprising a processor device with programmed instructions to:
   receive at a virtual machine hosted on a hardware device, from a user device and via a network, encrypted credentials for logging on a user associated with the user device to an interactive session on an operating system of the virtual machine wherein the encrypted credentials are stored in the user device encrypted by a symmetric key that is encrypted by a public key, wherein the user is a non-domain joined instance user that, at least, is not a part of enterprise/organization domain managed by an active directory service;
   receive, at the virtual machine, from a backplane server and via the network, encryption keys, wherein the encryption keys are stored in the backplane server;
   decrypt the credentials at the virtual machine;
   send, to an operating system, the decrypted credentials; and
   cause the operating system to log the user on to the virtual machine.

2. The apparatus of claim 1, wherein the encrypted credentials are received from a storage of the user device.

3. The apparatus of claim 1, wherein the virtual machine deletes the credentials responsive to logging the user on.

4. The apparatus of claim 1, wherein logging the user on to the virtual machine enables network access limited to the virtual machine.

5. The apparatus of claim 1, wherein the credentials are received via a first communication channel of the network, the processor device having further programmed instructions to receive, from a server and via a second communication channel the network, a key to decrypt the credentials.

6. The apparatus of claim 1, the processor device having further programmed instructions to receive, from the user device, a key to decrypt the credentials.

7. The apparatus of claim 1, the processor device having further programmed instructions to detect logon errors associated with the decrypted credentials.

8. A non-transitory computer readable storage medium having instructions stored thereon that, upon execution by a processor device, causes the processor device to perform operations of a single sign-on mechanism comprising:
   receiving at a virtual machine hosted on a hardware device, from a user device and via a network, encrypted credentials for logging on a user associated with the user device to an interactive session on an operating system of the virtual machine wherein the encrypted credentials are stored in the user device encrypted by a symmetric key that is encrypted by a public key, wherein the user is a non-domain joined instance user that, at least, is not a part of enterprise/organization domain managed by an active directory;
   receiving, at the virtual machine, from a backplane server and via the network, encryption keys, wherein the encryption keys are stored in the backplane server;
   decrypting the credentials at the virtual machine;
   sending, to an operating system, the decrypted credentials; and
   causing the operating system to log the user on to the virtual machine.

9. The medium of claim 8, wherein the encrypted credentials are received from a storage of the user device.

10. The medium of claim 8, wherein the virtual machine deletes the credentials responsive to logging the user on.

11. The medium of claim 8, wherein logging the user on to the virtual machine enables network access limited to the virtual machine.

12. The medium of claim 8, wherein the credentials are received via a first communication channel of the network, the operations further comprising receiving, from a server and via a second communication channel the network, a key to decrypt the credentials.

13. The medium of claim 8, the operations further comprising receiving, from the user device, a key to decrypt the credentials.

14. The medium of claim 8, the operations further comprising detecting logon errors associated with the decrypted credentials.

15. A computer-implemented method for performing a single sign-on mechanism comprising:
   receiving at a virtual machine hosted on a hardware device, by a processor device, from a user device, and via a network, encrypted credentials for logging on a user associated with the user device to an interactive session on an operating system of a virtual machine wherein the encrypted credentials are stored in the user device encrypted by a symmetric key that is encrypted by a public key, wherein the user is a non-domain joined instance user that, at least, is not a part of enterprise/organization domain managed by an active directory service;
   receiving, at the virtual machine, from a backplane server and via the network, encryption keys, wherein the encryption keys are stored in the backplane server;
   decrypting, by the processor device, the credentials at the virtual machine;
   sending, by the processor device and to an operating system of the virtual machine, the decrypted credentials; and
   causing, by the processor device, the operating system to log the user on to the virtual machine.

16. The method of claim 15, wherein the encrypted credentials are received from a storage of the user device.

17. The method of claim 15, wherein the virtual machine deletes the credentials responsive to logging the user on.

18. The method of claim 15, wherein logging the user on to the virtual machine enables network access limited to the virtual machine.

19. The method of claim 15, wherein the credentials are received via a first communication channel of the network, the method further comprising receiving, from a server and via a second communication channel the network, a key to decrypt the credentials.

20. The method of claim 15, further comprising receiving, from the user device, a key to decrypt the credentials.

21. A non-transitory computer readable storage medium having instructions stored thereon that, upon execution by a processor device, causes the processor device to perform operations of a single sign-on mechanism comprising:
- serving as a proxy for a user to logon to an interactive session on an operating system of a virtual machine by:
  - receiving, at a virtual machine hosted on a hardware device from a remote computer of the user, via a first communication channel across a network, and using a first command-and-control communication protocol, a symmetric key encrypted by a public key and credentials encrypted by the symmetric key, the credentials for logging on the user to the interactive session on the operating system of the virtual machine, wherein the user is a non-domain joined instance user that, at least, is not a part of enterprise/organization domain managed by an active directory service;
  - receiving, from a backplane server, via a second communication channel across the network, and using a second command-and-control communication protocol, a private key corresponding with the public key, wherein the private key is stored in the backplane server;
  - decrypting the encrypted symmetric key with the private key;
  - decrypting the encrypted credentials with the decrypted symmetric key;
  - sending, to the operating system, the decrypted credentials; and
  - causing the operating system to log the user on to the virtual machine.

22. The medium of claim 21, wherein a username indicates that the user is not part of the non-domain joined instance.

23. The medium of claim 22, wherein the user does not have an organization name in the username.

24. The medium of claim 21, wherein the virtual machine deletes the credentials responsive to logging the user on.

25. The medium of claim 21, wherein logging the user on to the virtual machine enables network access limited to the virtual machine.

* * * * *